US009565295B2

(12) United States Patent
Poznanski et al.

(10) Patent No.: US 9,565,295 B2
(45) Date of Patent: *Feb. 7, 2017

(54) SYSTEM AND METHOD FOR CELLULAR CALL MONITORING USING DOWNLINK CHANNEL CORRELATION

(71) Applicant: Verint Systems Ltd., Herzliya Pituach (IL)

(72) Inventors: Arik Poznanski, Ramat Gan (IL); Itai Langer, Ness Ziona (IL)

(73) Assignee: VERINT SYSTEMS LTD., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,051

(22) Filed: Mar. 22, 2016

(65) Prior Publication Data
US 2016/0277565 A1    Sep. 22, 2016

Related U.S. Application Data

(63) Continuation of application No. 13/872,224, filed on Apr. 29, 2013, now Pat. No. 9,350,853.

(30) Foreign Application Priority Data

Apr. 29, 2012 (IL) ........................................ 219459

(51) Int. Cl.
*H04W 72/04* (2009.01)
*H04M 3/22* (2006.01)

(52) U.S. Cl.
CPC ......... *H04M 3/2281* (2013.01); *H04W 72/042* (2013.01); *H04M 2201/18* (2013.01); *H04M 2207/18* (2013.01)

(58) Field of Classification Search
CPC ........................... H04W 72/04; H04M 3/2281
See application file for complete search history.

(56) References Cited

U.S. PATENT DOCUMENTS 5,890,056 A     3/1999  Garner et al.
6,470,075 B1 * 10/2002  Prieur ................. H04M 3/2281
                                              379/35

(Continued)

FOREIGN PATENT DOCUMENTS

WO      2010/116292     10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Asghar Bilgrami
(74) *Attorney, Agent, or Firm* — Meunier Carlin & Curfman

(57) ABSTRACT

Methods and systems for monitoring communication of mobile communication terminals, such as cellular phones. An off-air monitoring system reconstructs both directions of a call conducted between two mobile terminals by receiving only downlink channels. The off-air monitoring system receives multiple downlink transmissions transmitted by base stations in a wireless communication network. The system uses the received downlink transmissions to reconstruct the bidirectional call content of calls conducted between wireless terminals. In order to reconstruct the bidirectional content of a given call, the system identifies and correlates the two downlink transmissions of that call from among the multiple received downlink transmissions.

20 Claims, 2 Drawing Sheets

(56) References Cited

U.S. PATENT DOCUMENTS

| | | |
|---|---|---|
| 8,213,957 B2 | 7/2012 | Bull et al. |
| 2007/0099561 A1 | 5/2007 | Voss |
| 2008/0293355 A1* | 11/2008 | Giloh ................. H04B 7/18567 |
| | | 455/3.02 |
| 2011/0150211 A1* | 6/2011 | Anderson ............... H04L 63/30 |
| | | 380/1 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

"Cell Scanning and Catcher Detection in unnoticeable pocket size," NetHawk C2, Data sheet, version 1.4, EXFO, 2010, 4 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.

Strobel, D., "IMSI Catcher," Seminararbeit, Ruhr-Universitat Bochum, 2007, pp. 13-24.

Vedaldi, A., "An implementation of SIFT detector and descriptor," University of California at Los Angeles, 2007, 7 pages.

\* cited by examiner

SYSTEM AND METHOD FOR CELLULAR CALL MONITORING USING DOWNLINK CHANNEL CORRELATION

CROSS-REFERENCE TO RELATED APPLICATIONS

This application is a continuation of, and claims the benefit of priority to, U.S. patent application Ser. No. 13/872,224 filed Apr. 29, 2013, the disclosure of which is incorporated herein by reference in its entirety.

FIELD OF THE DISCLOSURE

The present disclosure relates generally to communication monitoring, and particularly to methods and systems for monitoring using downlink channel correlation.

BACKGROUND OF THE DISCLOSURE

Various techniques for monitoring communication in wireless communication networks are known in the art. Some monitoring systems use passive, off-air techniques that receive wireless signals transmitted by wireless terminals and/or base stations.

SUMMARY OF THE DISCLOSURE

An embodiment that is described herein provides a method including receiving multiple downlink transmissions that are transmitted in at least one wireless communication network. First and second downlink transmissions, which carry respective first and second opposite directions of a given call, are identified among the multiple downlink transmissions. A content of the given call is reconstructed from the identified first and second downlink transmissions.

In some embodiments, identifying the first and second downlink transmissions includes extracting first signaling information from the first downlink transmission, extracting second signaling information from the second downlink transmission, and finding a correlation between the first and second signaling information. In an embodiment, extracting the first and second signaling information includes extracting a first identifier from the first downlink transmission and a second identifier from the second downlink transmission, and finding the correlation includes correlating the first and second identifiers with a same communication terminal that participates in the given call.

In another embodiment, identifying the first and second downlink transmissions includes identifying a call-progress signaling pattern that is correlative in time in the first and second downlink transmissions. In yet another embodiment, identifying the first and second downlink transmissions includes extracting first voice content from the first downlink transmission and second voice content from the second downlink transmission, and finding a correlation between the first and second voice contents. Finding the correlation may include detecting a time correlation between voice activity periods in the first voice content and silence periods in the second voice content.

In some embodiments, receiving the downlink transmissions includes receiving the first downlink transmission from a first base station, and receiving the second downlink transmission from a second base station that is different from the first base station. In an embodiment, receiving the downlink transmissions includes receiving the first downlink transmission from a first wireless communication network, and receiving the second downlink transmission from a second wireless communication network that is different from the first wireless communication network.

In a disclosed embodiment, receiving the downlink transmissions includes receiving the first downlink transmission using a first receiver, and receiving the second downlink transmission using a second receiver that is separate from the first receiver. In an embodiment, reconstructing the content includes reconstructing the given call in real-time while the given call is in progress. In an alternative embodiment, reconstructing the content includes reconstructing the given call off-line after the given call ends.

In some embodiments, identifying the first and second downlink transmissions includes applying multiple different correlation criteria to the multiple downlink transmissions. Applying the multiple different correlation criteria may include applying a first correlation criterion to the multiple downlink transmissions so as to identify a set of candidate pairs of the downlink transmissions, and applying a second correlation criterion to the set of the candidate pairs so as to identify the first and second downlink transmissions.

There is additionally provided, in accordance with an embodiment that is described herein, apparatus including at least one receiver and a processor. The receiver is configured to receive multiple downlink transmissions that are transmitted in at least one wireless communication network. The processor is configured to identify among the multiple downlink transmissions first and second downlink transmissions that carry respective first and second opposite directions of a given call, and to reconstruct a content of the given call from the identified first and second downlink transmissions.

There is also provided, in accordance with an embodiment that is described herein, apparatus including a storage device and a processor. The storage device is configured to store multiple downlink transmissions that are received from at least one wireless communication network. The processor is configured to identify among the multiple downlink transmissions first and second downlink transmissions that carry respective first and second opposite directions of a given call, and to reconstruct a content of the given call from the identified first and second downlink transmissions.

The present disclosure will be more fully understood from the following detailed description of the embodiments thereof, taken together with the drawings in which:

DETAILED DESCRIPTION OF EMBODIMENTS

Overview

Figure 1:
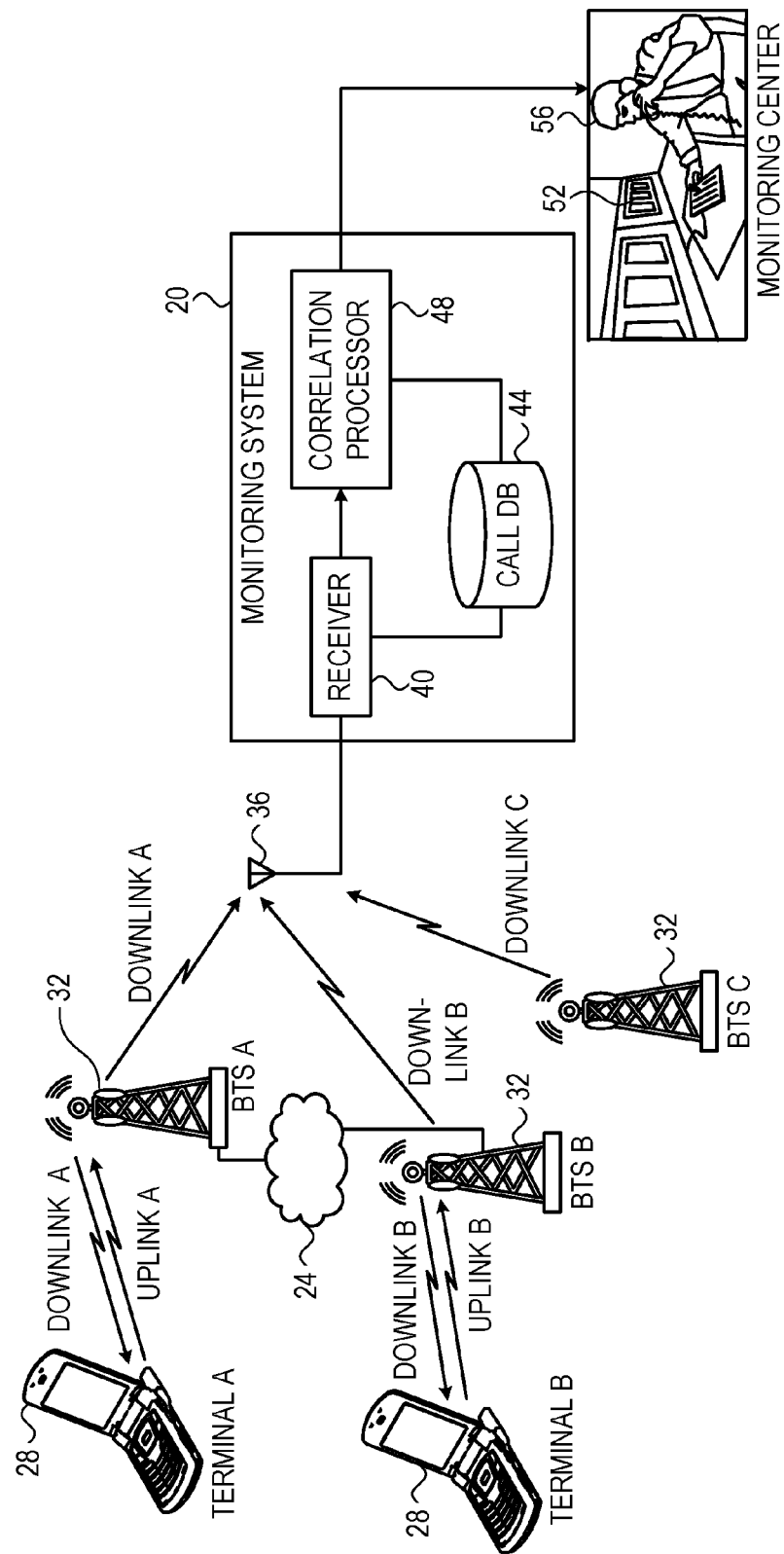
FIG. 1 is a block diagram that schematically illustrates a system for monitoring calls in a wireless communication network, in accordance with an embodiment that is described herein.

When a wireless communication terminal conducts a call via a base station of a wireless network, one direction of the call is transmitted on an uplink channel from the terminal to the base station, and the opposite direction of the call is transmitted on a downlink channel from the base station to the terminal. In many communication monitoring applications, it is desirable to monitor both directions of the call and to reconstruct the full bidirectional call content.

In practice, however, monitoring uplink channels is often much more difficult than monitoring downlink channels. For example, base stations typically have a higher transmission power and superior line-of-sight conditions than terminals. Put in another way, the downlink channel can typically be received at much greater distances than the corresponding uplink channel. Therefore, an off-air monitoring system is often able to receive the downlink channel but not the uplink channel of a given terminal. In such a case, the monitoring system will be unable to reconstruct the bidirectional call content.

Embodiments that are described herein provide improved methods and systems for monitoring communication of mobile communication terminals, such as cellular phones. In the disclosed embodiments, an off-air monitoring system reconstructs both directions of a call conducted between two mobile terminals by receiving only downlink channels.

The disclosed techniques are based on the fact that, in a call between two wireless terminals, the downlink channel transmitted to one terminal carries the same content as the uplink channel transmitted from the other terminal. Therefore, the bidirectional content of such a call (as opposed to a call between a wireless terminal and a wire-line terminal outside the wireless network) can be reconstructed from the two downlink channels transmitted to the two terminals.

In some embodiments, the off-air monitoring system receives multiple downlink transmissions transmitted by base stations in a wireless communication network. The system uses the received downlink transmissions to reconstruct the bidirectional call content of calls conducted between wireless terminals. In order to reconstruct the bidirectional content of a given call, the system identifies and correlates the two downlink transmissions of that call from among the multiple received downlink transmissions.

Several example techniques for correlating a pair of downlink transmissions belonging to the same call are described herein. In some embodiments, the system correlates signaling information (e.g., terminal identifiers) that is extracted from the downlink transmissions. In other embodiments, the system finds a call-progress pattern (e.g., call set-up and/or call termination signaling pattern) that is correlative in time in a pair of downlink transmissions. As yet another example, the system may establish the correlation based on voice content that is extracted from the downlink transmissions (e.g., by finding a correlation between voice activity periods in one downlink transmission and silence periods in another downlink transmission).

In summary, the disclosed techniques receive only downlink transmissions, but nevertheless reconstruct the two opposite directions of monitored calls. Since the disclosed techniques are based only on downlink transmissions, the monitoring system may be located at a large distance from the monitored network and it may operate successfully under harsh channel and interference conditions. The various correlation criteria between downlink transmissions enable real-time, near-real-time or off-line reconstruction of the bidirectional call content.

Although the embodiments described herein refer mainly to cellular networks, the downlink transmissions may be received from other types of networks, such as satellite networks. In some embodiments, the two correlative downlink transmissions of a call originate from two different wireless networks, such as two different cellular networks or a terrestrial cellular network and a satellite communication network.

System Description

FIG. 1 is a block diagram that schematically illustrates a system 20 for monitoring calls in a wireless communication network 24, in accordance with an embodiment that is described herein. System 20 can be used, for example, for gathering intelligence or tracking suspects in various Government and Lawful Interception (LI) applications.

Wireless network 24 may comprise any suitable wireless communication network that operates in accordance with any suitable wireless standard or protocol, for example a cellular network such as a Global System for Mobile Communications (GSM), Code Division Multiple Access (CDMA), Universal Mobile Telecommunications System (UMTS) or iDEN network. Network 24 comprises multiple base stations (BTSs) 32 and other nodes such as switches (not shown).

Although the embodiments described herein refer mainly to cellular networks, the disclosed techniques can also be used with other types of wireless networks, such as satellite communication networks. Examples of satellite networks include Thuraya, Iridium, Inmarsat, among others. The disclosed techniques can also be used to correlate downlink channels from different networks, such as two different cellular networks, two different satellite networks or a cellular network and a satellite network. Certain aspects of joint monitoring of a cellular network and a satellite network are addressed in Israel Patent Application 212968, entitled "System and method for joint passive interception of satellite and cellular communication," filed May 18, 2011, whose disclosure is incorporated herein by reference.

Wireless communication terminals 28, such as cellular phones, communicate via BTSs 28 with one another, and/or with wireless or wire-line terminals in other networks. The example of FIG. 1 shows three BTSs and two terminals for the sake of clarity. Real-life networks typically comprise a large number of BTSs and terminals.

Monitoring system 20 monitors and reconstructs the content of calls conducted between terminals 28, by receiving and correlating downlink channels from BTSs 32. (In the present context, the terms "downlink channels" and "downlink transmissions" are used interchangeably.)

System 20 comprises an antenna 36 for receiving downlink signals from the BTSs. A front-end receiver 40 downconverts the downlink signals to baseband, digitizes the baseband signals and decodes the downlink transmissions from the signals. In some embodiments, system 20 comprises a call database 44 for storing content of received downlink transmissions, signaling of received downlink transmissions, metadata related to received downlink transmissions and/or any other suitable information. Database 44 may be implemented using any suitable storage device.

A correlation processor 48 processes the received downlink transmissions in order to reconstruct the bidirectional content of calls, using techniques that are described in detail below. The reconstructed call content, possibly together with metadata or other information related to the calls, are provided to a monitoring center 52 and presented to an operator 56.

The configuration of system 20 shown in FIG. 1 is an example configuration, which is chosen purely for the sake of conceptual clarity. In alternative embodiments, any other suitable system configuration can also be used. Some elements of system 20 may be implemented in hardware, e.g., in one or more Application-Specific Integrated Circuits (ASICs) or Field-Programmable Gate Arrays (FPGAs). Additionally or alternatively, some system elements can be implemented using software, or using a combination of hardware and software elements.

Some of the functions of system 20, such as the functions of correlation processor 48, may be carried out using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Bidirectional Call Reconstruction Based on Downlink Transmission Correlation

In some embodiments, correlation processor 48 reconstructs the content (typically voice content) of calls that are conducted between terminals 28 of network 24, exclusively based on downlink transmissions and without a need to receive uplink transmissions.

Consider the example shown in FIG. 1. In this example, two terminals 28 denoted "terminal A" and "terminal B" conduct a voice call with one another. During this call, terminal A communicates with network 24 via a BTS denoted "BTS A", and terminal B communicates with the network via a BTS denoted "BTS B". (As explained above, the embodiments described herein refer mainly to cellular networks, but the disclosed techniques can also be used in satellite networks. In the case of a satellite downlink channel, a satellite plays the role of the BTS.)

The call is carried over a total of four channels: One direction of the call (from terminal A to terminal B) is carried first over an uplink channel of terminal A denoted "Uplink A" and then over a downlink channel of terminal B denoted "downlink B". The opposite direction of the call (from terminal B to terminal A) is carried first over an uplink channel of terminal B denoted "Uplink B" and then over a downlink channel of terminal A denoted "downlink A".

In such a terminal-to-terminal call, the voice content of uplink A is transmitted over downlink B, and the voice content of uplink B is transmitted over downlink A. Therefore, system 20 is able to reconstruct the two opposite directions of the call from downlink A and downlink B, without a need to receive any of the uplink channels.

In a typical embodiment, receiver 40 of system 20 receives a large number of downlink transmissions. Some of the received downlink transmissions belong to terminal-to-terminal calls, and others (e.g., downlink C received from BTS C) may not. The received downlink transmissions are typically stored in call database 44.

In order to reconstruct the bidirectional content of a given call from among the large number of received downlink transmissions, processor 48 needs to identify the pair of downlink transmissions that carry the two directions of that call. Typically, processor 48 has no prior identification of pairs of downlink transmissions, and therefore it establishes the correlation using characteristics of the downlink transmissions themselves.

Figure 2:
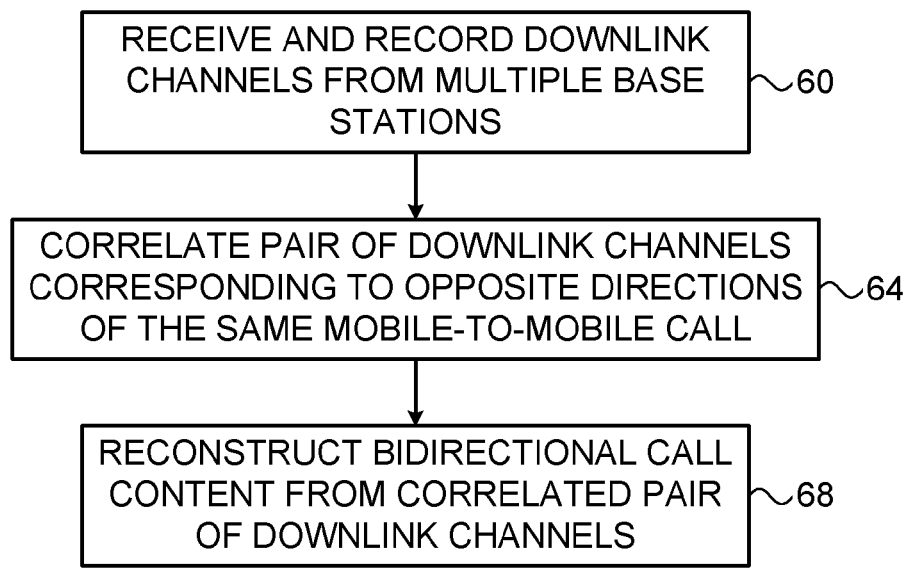
FIG. 2 is a flow chart that schematically illustrates a method for monitoring calls in a wireless communication network, in accordance with an embodiment that is described herein.

FIG. 2 is a flow chart that schematically illustrates a method for monitoring calls in network 24, in accordance with an embodiment that is described herein. The method begins with receiver 40 receiving multiple downlink transmissions from BTSs 32 of network 24, at a reception step 60. The receiver typically records the received downlink transmissions in database 44.

Correlation processor 64 correlates a pair of received downlink transmissions that carry the opposite directions of the same terminal-to-terminal call, at a correlation step 64. Based on the established correlation, processor 64 reconstructs the bidirectional content of the call from the pair of downlink transmissions, at a reconstruction step 68. The call content is typically provided as output to monitoring center 52.

The method description above refers to correlation and processing of a single call, for the sake of clarity. Typically, however, processor 48 carries out this process, possibly simultaneously, for a large number of calls. In some embodiments the processor is provided with a predefined list of target terminals, and reconstructs the calls conducted by these target terminals. In other embodiments, processor 48 reconstructs calls indiscriminately, i.e., regardless of any prior designation of terminals as targets.

Example Correlation Criteria

In various embodiments, correlation processor 48 may use various methods and criteria for identifying a pair of downlink transmissions that carry the opposite directions of the same call.

In one embodiment, processor 48 extracts signaling information from the downlink transmissions, and attempts to correlate pairs of downlink transmissions whose signaling information indicates that they belong to the same call. As noted above, the signaling of different downlink transmissions may originate from different networks that operate in accordance with different protocols. For example, one downlink transmission may comprise a GSM call while another downlink transmission may comprise a CDMA call. As another example, one downlink transmission may carry Thuraya signaling while another downlink transmission may carry GSM signaling. Alternatively, the downlink transmissions may originate from the same network.

The signaling information may comprise, for example, identifiers of terminals 28 such as International Mobile Subscriber Identity (IMSI) or Temporary Mobile Subscriber Identity (TMSI). In this embodiment processor 48 may extract one identifier from one downlink transmission, another identifier from another downlink transmission, and correlate the two identifiers to determine that the two downlink transmissions belong to the same call.

In many practical cases, the signaling in a given downlink transmission carries the phone number (e.g., caller ID or called number) of the opposite side of the call (the receiving side typically signals the calling number, the originating side typically signals the called number).

The over-the-air signaling usually carries only the TMSI of the side that is intercepted, but in various scenarios processor 48 may have succeeded in previously correlating the TMSI to the IMSI/MSISDN of that terminal. This sort of correlation may be performed, for example, using equipment that is sometimes referred to as IMSI catcher. Techniques of this sort are addressed, for example, in Israel Patent Application 212577, entitled "System and method for combined passive and active interception of mobile communication," filed Apr. 28, 2011, whose disclosure is incorporated herein by reference.

In some embodiments, processor 48 focuses on correlating downlink transmissions based on Call Control (CC) messages in the downlink transmission signaling. Such messages are typically time-synchronized between the two sides of the call, and therefore are good candidates for establishing the correlation. CC messages that can be used by processor 48 for correlation may comprise, for example, a SETUP message (containing the dialed number when sent from the mobile terminal to the BSC, and containing the calling number when sent in the opposite direction), an ALERT message (sent when the receiving side starts ringing), an ANSWER message (sent when the receiving side answers), a DISCONNECT message used for signaling call disconnection, and/or any other suitable message.

In another embodiment, processor 48 identifies a pair of downlink transmissions that together exhibit a call-progress signaling pattern that is correlative in time and characteristic of a single call. Typically, wireless communication protocols define the exact call-progress signaling to be followed, for example, in call set-up and call termination procedures. These procedures typically define the order of signaling messages exchanged between the two endpoints of the call, as well as timing constraints for signaling messages and responses.

In an example embodiment, processor 48 identifies a pair of downlink transmissions having the same call start time, the same call duration and/or the same call end time. In another embodiment, processor 48 identifies a pair of downlink transmissions that are consistent in terms of the session type. For example, processor 48 may correlate pairs of downlink transmissions in which one downlink transmission indicates an incoming session type and the other indicates an outgoing session type. In other words, processor 48 may rule out pairs of downlink transmissions in which both transmissions indicate an outgoing session type, and pairs of downlink transmissions in which both transmissions indicate an incoming session type.

In some embodiments, processor 48 examines pairs of downlink transmissions against the call-progress specifications of the applicable wireless protocol. If the flow of signaling messages in a pair of downlink transmissions meets the specification, in terms of the order and timing of signaling messages, processor 48 may conclude that the transmissions are likely to belong to the same call. If the flow of signaling in a pair of downlink transmissions violates the specification, processor 48 typically concludes that they belong to different calls.

In other embodiments, processor 48 identifies a pair of downlink transmissions that carry the opposite directions of the same call by extracting and correlating the voice content of the transmissions. For example, in a typical voice call, when one party speaks the other party is silent. Therefore, in a typical voice call there is high correlation between periods of voice activity in one call direction and periods of silence in the opposite call direction.

In some embodiments, processor 48 assesses the correlation between the occurrence of voice activity periods in one downlink transmission and silence periods in another downlink transmission. If the correlation is high, processor 48 may conclude that the two transmissions are likely to carry the opposite directions of the same call, and vice versa. For example, processor 48 may measure the percentage of time in which voice activity is detected simultaneously in both transmissions, and compare it to the percentage of time in which voice activity is detected only in one of the transmissions. As another example, processor 48 may identify pairs of downlink transmissions having correlative voice activity patterns.

In alternative embodiments, processor 48 may use any other suitable method or criterion for identifying pairs of downlink transmissions that carry the opposite directions of the same call.

The correlation criteria described above may be applied in real-time (e.g., while the call is still in progress), in semi-real-time (e.g., shortly after the call), or off-line. For example, correlation based on call set-up signaling can be used for real-time correlation, whereas correlation based on voice activity or call termination are more suitable for semi-real-time correlation. Off-line correlation can be carried out using any of the disclosed techniques.

In some embodiments, processor 48 uses a combination of two or more correlation criteria, in order to increase the correlation confidence level and eliminate false correlations. In some embodiments, processor 48 establishes a certain initial correlation based on one criterion (e.g., establishes a list of candidate pairs of transmission based on call set-up signaling correlation), and then refines the list using another criterion (e.g., voice activity or call termination signaling). This progressive technique enables system 20 to provide real-time output having a certain initial confidence level, and later increase the confidence level and refine the results.

In the embodiments described above, the two terminals conducting the call communicate via different BTSs of the same wireless network. The techniques described herein, however, are in no way limited to this scenario. For example, system 20 may receive the two downlink transmissions of the same call from a single BTS, e.g., when the two terminals are in close proximity.

As another example, in a given call, one terminal may communicate in one wireless network and the other terminal may communicate in another wireless network. In this embodiment, system 20 may receive downlink transmissions from BTSs in both wireless networks, and establish the correlations a explained above. The two wireless networks may operate in accordance with the same wireless protocol or different wireless protocols.

As yet another example, system 20 may comprise multiple receivers and/or antennas that are not necessarily collocated. In an example embodiment, a distributed configuration of system 20 comprises multiple receivers 40 (with respective antennas 36) located in different geographical locations. The downlink transmissions received by the multiple receivers are provided to processor 48 for analysis as explained above. This sort of distributed configuration enables system 20 to receive downlink transmissions from a large number of BTSs over a wide geographical area, and/or from different wireless networks.

Although the embodiments described herein mainly address cellular networks, the principles of the present disclosure can also be used for correlating downlink transmissions is other types of networks or across different network types. In one example embodiment, system 20 receives the downlink transmissions from a satellite of a satellite communication network (e.g., Thuraya). In this embodiment, system 20 may intercept the bidirectional content between satellite terminals by correlating two downlink transmissions from the satellite network (or from two different satellite networks).

In another example embodiment, system 20 receives downlink transmissions from a cellular network (e.g., a GSM network), as well as downlink transmissions from a satellite of a satellite communication network (e.g., Thuraya). In this embodiment, system 20 may intercept the bidirectional content between a cellular terminal and a satellite terminal by correlating a respective downlink transmission from each network type.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for reconstructing bidirectional call content of calls conducted between wireless communication terminals, the method being exclusively based on downlink transmissions without a need to receive any uplink channels, the method comprising:

receiving, by a monitoring system, multiple downlink transmissions that have been or are being transmitted from at least one base station or satellite of at least one wireless communication network to wireless communication terminals of the at least one wireless communication network;

identifying, by the monitoring system, among the multiple downlink transmissions, a pair of first and second downlink transmissions that carry respective first and second opposite directions of a given terminal-to-terminal call, wherein the monitoring system has no prior identification of pairs of downlink transmissions; and reconstructing, by the monitoring system, a bidirectional content of the given call from the identified first and second downlink transmissions.

2. The method according to claim 1, wherein identifying the first and second downlink transmissions comprises extracting first signaling information from the first downlink transmission, extracting second signaling information from the second downlink transmission, and finding a correlation between the first and second signaling information.

3. The method according to claim 2, wherein extracting the first and second signaling information comprises extracting a first identifier from the first downlink transmission and a second identifier from the second downlink transmission, and wherein finding the correlation comprises correlating the first and second identifiers with a same communication terminal that participates in the given call.

4. The method according to claim 1, wherein identifying the first and second downlink transmissions comprises identifying a call-progress signaling pattern that is correlative in time in the first and second downlink transmissions.

5. The method according to claim 1, wherein identifying the first and second downlink transmissions comprises extracting first voice content from the first downlink transmission and second voice content from the second downlink transmission, and finding a correlation between the first and second voice contents.

6. The method according to claim 5, wherein finding the correlation comprises detecting a time correlation between voice activity periods in the first voice content and silence periods in the second voice content.

7. The method according to claim 1, wherein receiving the downlink transmissions comprises receiving the first downlink transmission from a first base station, and receiving the second downlink transmission from a second base station that is different from the first base station.

8. The method according to claim 1, wherein receiving the downlink transmissions comprises receiving the first downlink transmission from a first wireless communication network, and receiving the second downlink transmission from a second wireless communication network that is different from the first wireless communication network.

9. The method according to claim 1, wherein receiving the downlink transmissions comprises receiving the first downlink transmission using a first receiver, and receiving the second downlink transmission using a second receiver that is separate from the first receiver.

10. The method according to claim 1, wherein reconstructing the content comprises reconstructing the given call in real-time while the given call is in progress.

11. The method according to claim 1, wherein reconstructing the content comprises reconstructing the given call off-line after the given call ends.

12. The method according to claim 1, wherein identifying the first and second downlink transmissions comprises applying multiple different correlation criteria to the multiple downlink transmissions.

13. The method according to claim 12, wherein applying the multiple different correlation criteria comprises applying a first correlation criterion to the multiple downlink transmissions so as to identify a set of candidate pairs of the downlink transmissions, and applying a second correlation criterion to the set of the candidate pairs so as to identify the first and second downlink transmissions.

14. An apparatus for reconstructing bidirectional call content of calls conducted between wireless communication terminals, the reconstruction being exclusively based on downlink transmissions without a need to receive any uplink channels, the apparatus comprising:

at least one receiver, which is configured to receive multiple downlink transmissions that have been or are being transmitted from at least one base station or satellite of at least one wireless communication network to wireless communication terminals of the at least one wireless communication network; and a processor, which is configured to identify, among the multiple downlink transmissions, a pair of first and second downlink transmissions that carry respective first and second opposite directions of a given terminal-to-terminal call, and to reconstruct a bidirectional content of the given call from the identified first and second downlink transmissions, wherein the processor has no prior identification of pairs of downlink transmissions.

15. The apparatus according to claim 14, wherein the processor is configured to extract first signaling information from the first downlink transmission, to extract second signaling information from the second downlink transmission, and to find a correlation between the first and second signaling information.

16. The apparatus according to claim 15, wherein the processor is configured to extract a first identifier from the first downlink transmission and a second identifier from the second downlink transmission, and to correlate the first and second identifiers with a same communication terminal that participates in the given call.

17. The apparatus according to claim 14, wherein the processor is configured to identify the first and second downlink transmissions by identifying a call-progress signaling pattern that is correlative in time in the first and second downlink transmissions.

18. The apparatus according to claim 14, wherein the processor is configured to extract first voice content from the first downlink transmission and second voice content from the second downlink transmission, and to find a correlation between the first and second voice contents.

19. The apparatus according to claim 18, wherein the processor is configured to find the correlation by detecting a time correlation between voice activity periods in the first voice content and silence periods in the second voice content.

20. The apparatus according to claim 14, wherein the at least one receiver is configured to receive the first downlink transmission from a first base station, and to receive the second downlink transmission from a second base station that is different from the first base station.

\* \* \* \* \*